United States Patent [19]

Starr

[11] 4,439,752
[45] Mar. 27, 1984

[54] SEMICONDUCTOR PRESSURE TRANSDUCER

[75] Inventor: James B. Starr, St. Paul, Minn.

[73] Assignee: Honeywell Inc., Minneapolis, Minn.

[21] Appl. No.: 314,650

[22] Filed: Oct. 26, 1981

[51] Int. Cl.³ .............................................. G01L 1/22
[52] U.S. Cl. ....................................... 338/2; 73/721; 73/727; 338/4
[58] Field of Search ....................................... 338/2–5, 338/42; 73/720, 721, 726, 727

[56] References Cited

U.S. PATENT DOCUMENTS 3,537,319  11/1970  Yerman ................................. 338/4 X
4,173,900  11/1979  Tanabe et al. ........................ 73/727
4,333,349  6/1982  Mallon et al. ....................... 338/3 X

FOREIGN PATENT DOCUMENTS 34807  9/1981  European Pat. Off. .............. 73/727

Primary Examiner—C. L. Albritton
Attorney, Agent, or Firm—Lewis P. Elbinger

[57] ABSTRACT

A transducer for sensing pressure, wherein the transducer is formed of a single crystal semiconductor square chip having piezoresistive stress sensors disposed on one surface thereof and a cavity formed in the opposite surface, and wherein one of the edges of the chip is oriented at an angle of substantially 22.5° with respect to a <110> crystal direction of the chip.

15 Claims, 4 Drawing Figures

SEMICONDUCTOR PRESSURE TRANSDUCER

BACKGROUND OF THE INVENTION

This invention relates to semiconductor pressure transducers and, more particularly, to such transducers which are formed to compensate for signals occurring at zero pressure differential.

The semiconductor pressure transducers known in the prior art employ a diaphragm responsive to the pressure differential across the two surfaces thereof. The diaphragm is formed of a single crystal semiconductor chip having stress sensors disposed on one surface thereof. Stress sensors which are widely used for this purpose exhibit a piezoresistive characteristic, whereby the resistance of the sensor varies with the stress experienced by the sensor as the stress in the chip changes with the differential pressure. A circular cavity is formed in the other surface of the chip to form the diaphragm, and a cylindrical tube has one end thereof bonded to such other surface to surround the cavity.

Normally at least one pair of radial stress sensors and one pair of circumferential stress sensors are disposed on the surface of the chip.

Originally, circular chips having circular diaphragms were employed, whereby the entire transducer was symmetrical with respect to the common axis of the tube, the cavity, and the chip. More recently however, square semiconductor chips have come to be employed because a plurality of such square chips can be readily obtained by the dicing of a crystal wafer or slice. However, such a square chip no longer exhibits symmetry with respect to the axis of the cylindrical tube bonded to it.

The absence of axial symmetry and differences of material between the tube and chip in this prior art semiconductor pressure transducer result in false or spurious signals, termed "zero shift", as the static pressure (i.e., common to both surfaces of the diaphragm) or the temperature of the transducer varies. Specifically "zero shift" means a signal that changes as a result of some influence that occurs at zero pressure differential across the transducer diaphragm. Because of this zero shift phenomenon in the semiconductor pressure transducer of the prior art, electronic signal compensation is necessary for the measurement of differential pressures where high accuracy is required.

Accordingly, it is the principal object of the instant invention to provide an improved semiconductor pressure transducer.

Another object of the instant invention is to provide a semiconductor pressure transducer in which the zero shift characteristic is minimized.

Another object of the instant invention is to provide a semiconductor pressure transducer in which spurious signals are minimized.

Another object of the instant invention is to provide a semiconductor pressure transducer capable of measuring pressure differentials with greater accuracy than prior art devices.

SUMMARY OF THE INVENTION

In accordance with the instant invention, the above mentioned objects are achieved by providing a semiconductor pressure transducer of the type comprising a square chip diaphragm in which one edge of the chip is oriented at a unique angle with respect to a predetermined crystal axis of the chip or a particular sensor axis of the transducer. According to one embodiment of the invention, one edge of the square chip is oriented at an angle of substantially 22.5° with respect to a <110> crystal direction of the chip. By virtue of the instant invention, the changes in the radial and circumferential diaphragm stresses caused by temperature or static pressure changes are equal, so that the zero shift signal caused by temperature or static pressure changes is minimized.

BRIEF DESCRIPTION OF THE DRAWING

The invention will be described with reference to the accompanying drawing, wherein.

DESCRIPTION OF THE PREFERRED EMBODIMENT

Figure 1:
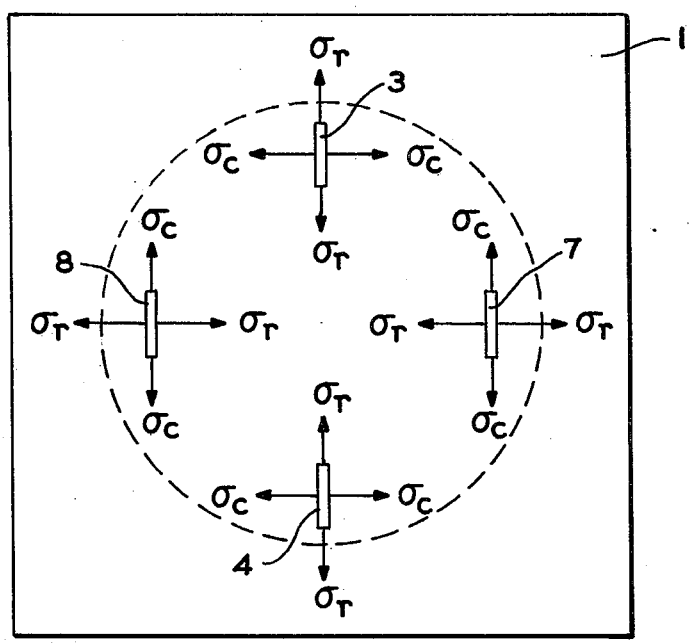
FIG. 1 is a schematic illustration of a prior art transducer.

The semiconductor pressure transducer shown schematically in FIG. 1 comprises a thin square semiconductor chip 1. Chip 1 is comprised of a single crystal semiconductor material, such as silicon. Radial stress sensors 3 and 4 are disposed on a first surface of chip 1. Circumferential stress sensors 7 and 8 are also disposed on such first surface. Sensors 3, 4, 7, and 8 are formed integrally with chip 1 by injecting, such as by diffusion, an impurity, such as boron, into the surface of chip 1 in surface regions defined according to the desired shapes of the sensors. Such a sensor exhibits a piezoresistive characteristic; i.e., its resistance changes with the stress experienced by the sensor.

A circular cavity, shown by the dashed lines in FIG. 1, is formed in the second surface of chip 1. A cylindrical tube, not shown, is bonded to such second surface and, generally, surrounds the cavity therein. The tube functions to communicate the pressure to be sensed to the cavity, whereby the portion of chip 1 overlying the cavity forms a diaphragm in which the stresses induced therein depend on the difference between the pressure communicated by the tube and the pressure on the first surface.

In FIG. 1, the sensors are shown in the form of strips. In practice a particular sensor may be formed of a plurality of parallel strips connected in series. In the prior art, these sensors are oriented in correspondence to the cylindrical coordinates of the cavity or pressure-communicating tube. Thus, sensors 3 and 4 of FIG. 1 are disposed with their lengths oriented along a radial direction of the cylindrical coordinates. Sensors 7 and 8, shown disposed parallel to sensors 3 and 4, have their lengths oriented along a circumferential direction of the cylindrical coordinates and are symmetrically disposed about a radial direction of the coordinates.

The stresses induced in chip 1 are sensed by the stress sensors, whose resistance varies correspondingly. Such stresses are generally described by reference to the axes of the sensors. Vectors representing the direction of stresses are shown as arrows in FIG. 1. The amplitude of the stresses represented by the vectors is denoted by the symbol $\sigma$ and is expressed in units of dynes/cm$^2$. Accordingly, the stresses induced along the lengths of radially oriented sensors 3 and 4 are termed radial stresses, $\sigma_r$, whereas the stresses induced transverse to sensors 3 and 4 are termed circumferential stresses, $\sigma_c$ (sometimes termed tangential stresses). Correspondingly the stresses induced along the lengths of circumferentially oriented sensors 7 and 8 are termed circumferential stresses, $\sigma_c$, and those induced transverse to sensors 7 and 8 are termed radial stresses, $\sigma_r$.

The zero shift as measured by the output signal generated when the four sensors 3, 4, 7 and 8 are connected in the form of a constant current wheatstone bridge, is given by:

$$e = \tfrac{1}{2} i_B R \pi_{44} (\sigma_r - \sigma_c) \tag{1}$$

where $i_B$ is the current applied to the bridge;

the product $R\pi_{44}$ is a function that varies only with the temperature of the transducer; and $\sigma_r$ and $\sigma_c$ are respectively the radial and circumferential stresses induced in the sensors.

For transducers which possess perfect axial symmetry, it can be shown that no zero shift signals will be generated even through the chip and tube are of different materials. In such instance, stresses generated at the surface of the chip diaphragm will be uniform and independent of direction, so that no bridge output signal will be generated. However, when the transducer chip is square instead of round, and is bonded to a cylindrical tube, there is a lack of axial symmetry in the structure.

Equation (1) above illustrates that the differences between the radial and circumferential stresses directly affect the zero shift signal. Moreover, where there is such a difference, a change in temperature (affecting $R\pi_{44}$) also contributes to the zero shift signal. However, equation (1) also illustrates that the zero shift signal can be minimized, or even eliminated, by making $\sigma_r$ and $\sigma_c$ equal.

In the prior art transducers, the sensors have been oriented either parallel or perpendicular to the edges of the chip, as shown in FIG. 1. Generally for such an orientation and placement of the sensors, the stresses $\sigma_r$ and $\sigma_c$ are not equal.

Figure 2:
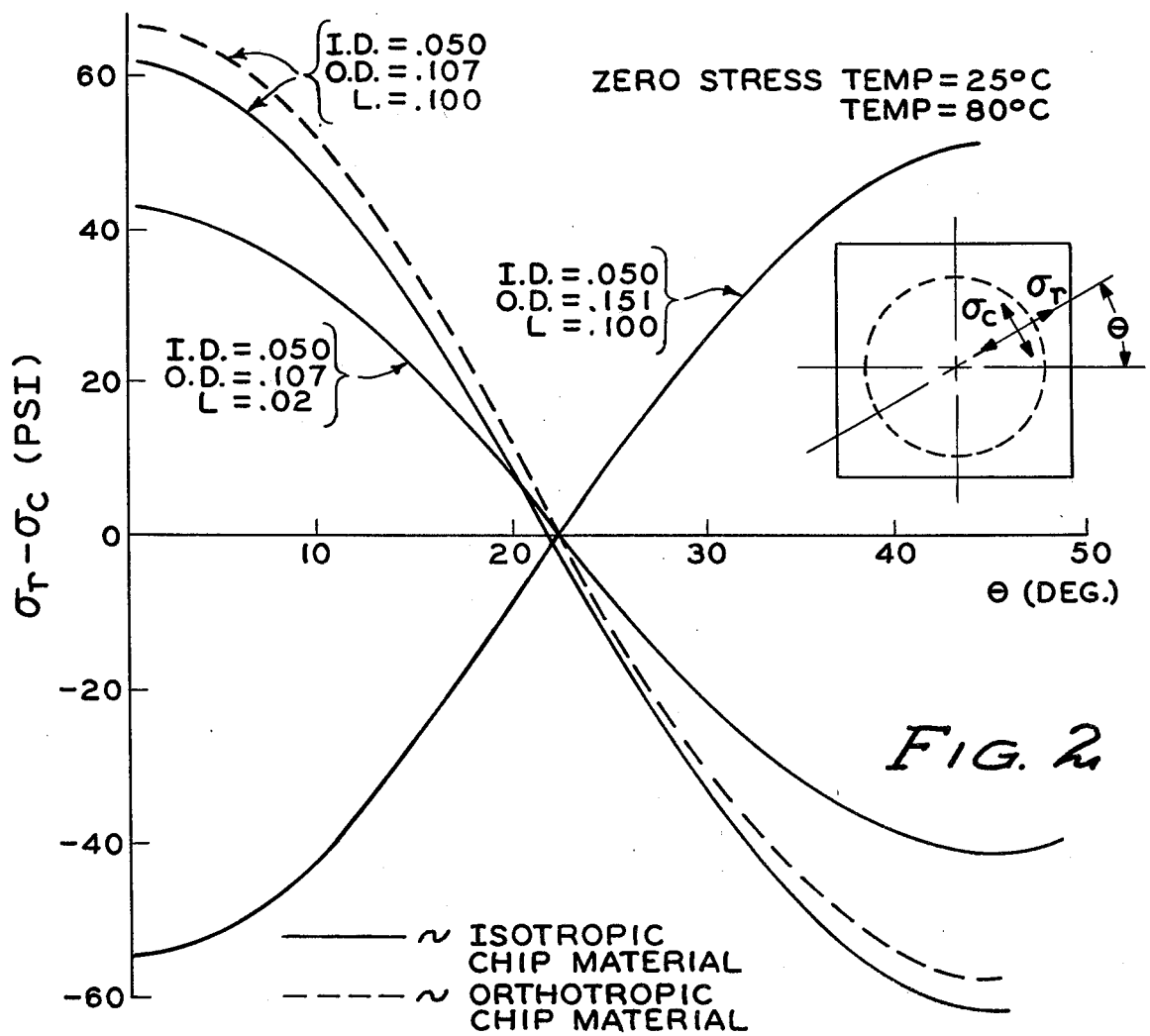
FIG. 2 are curves of the differences between radial and circumferential stresses, for different models of semiconductor pressure transducers comprising a square chip, as a function of the angle between the sensor orientation and the edges of the chip, for zero pressure differential across the chip.

To obviate this problem of such prior art transducers, the inventor of the instant application observed by experimental analysis, the variations of the differences between $\sigma_r$ and $\sigma_c$ for particular configurations of the transducer as the orientation of the sensors were changed. The results of this analysis, for different transducer models, each having a silicon chip and a pyrex tube, is shown in FIG. 2. For each of the models analyzed, the difference between the radial and circumferential stresses was plotted as the radial and circumferential stress sensors were rotated with respect to the edges of the square chip. For each of the models, the respective inner diameter, outer diameter and length of the attached cylindrical tube are shown adjacent the curve for such model. The sides of the chips employed were approximately 0.107" in length. Three models used chips of isotropic material and one used a chip of orthotropic material.

The inventor observed that for all models of the transducer analyzed, the radial and circumferential stresses were equal at an orientation angle, $\theta$, of approximately 22.5°. This orientation angle was the angle that the longitudinal axes of the sensors made with the linear edges of the chip. In addition, by making this orientation angle correspond to the angle which a <110> crystal direction of the chip makes with the edges of the chip, the change in resistance of the sensors will be proportional to the difference between radial and tangential stresses.

Figure 3:
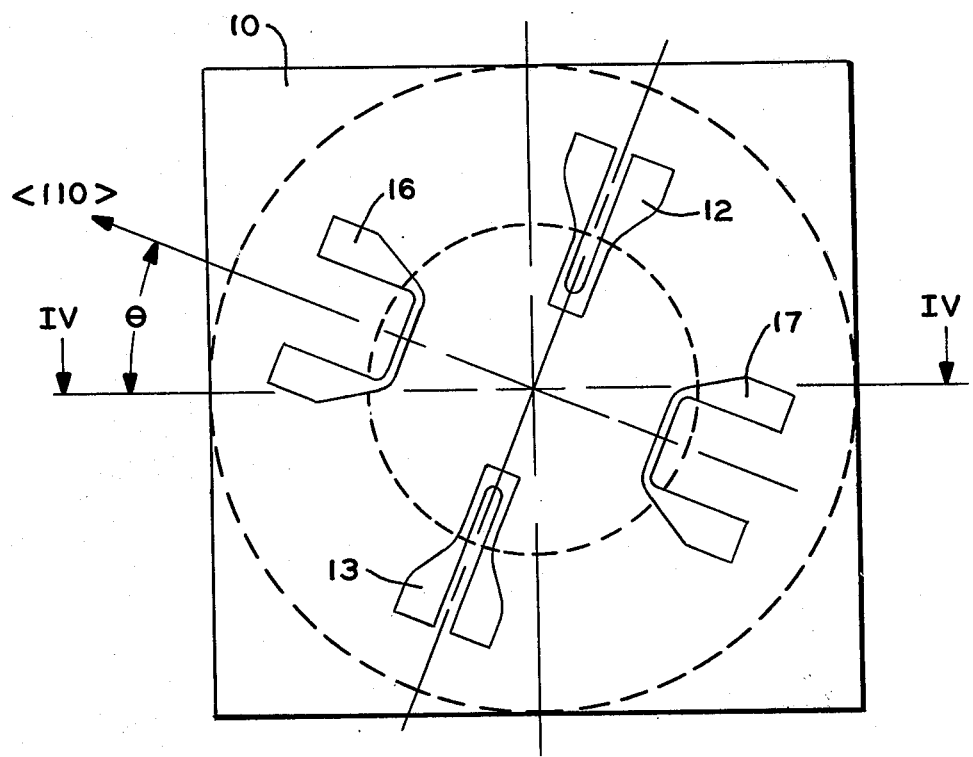
FIG. 3 is a top view of an embodiment of the instant invention.
Figure 4:
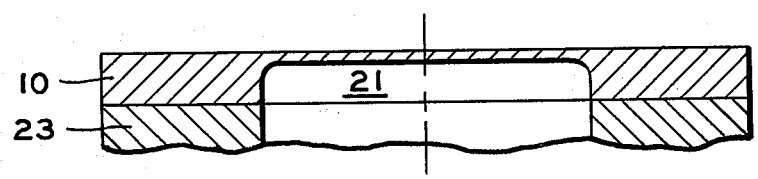
FIG. 4 is a sectional view of the embodiment of FIG. 3, taken on line IV—IV.

An embodiment of the instant invention, employing the principle demonstrated in FIG. 2 is illustrated in FIGS. 3 and 4. The semiconductor pressure transducer of FIGS. 3 and 4 comprises a square semiconductor chip 10 formed from a single crystal of semiconductor material, such as silicon. A pair of radial stress sensors 12 and 13 is disposed along an axis passing through the center of chip 10 and making an angle of approximately 22.5° with respect to one pair of edges of the chip. A pair of circumferential stress sensors 16 and 17 is disposed along and transverse to another axis passing through the center of chip 10 and making an angle of approximately 22.5° with respect to the other two edges of the chip. This latter axis is also parallel to the <110> crystal direction of the chip. Each stress sensor makes an angle of 22.5° with respect to one of the edges of chip 10.

Sensors 12, 13, 16 and 17 are formed integrally with chip 10 by injecting, such as by diffusion, an impurity, such as boron, into the surface of chip 10 in surface regions defining the shape of such sensors. Sensors 12, 13, 16 and 17 exhibit a piezoresistive characteristic. It is within the principles of the instant invention that each sensor may be composed of a plurality of parallel strips of piezoresistive material connected in series, with the lengths of such strips being oriented parallel to the direction of the sensors shown in FIG. 3.

A circular cavity, shown generally by the reference numeral 21 in FIG. 4, is formed in the surface of chip 10 opposite to the surface on which are disposed stress sensors 12, 13, 16 and 17. A cylindrical tube 23, shown in partial cross-section, is bonded to the surface of chip 10 opposite to the surface on which are disposed the stress sensors. Tube 23 may be formed from pyrex, for example, and bonded to the surface of chip 10. Tube 23 is illustrated as surrounding cavity 21, but it is within the principles of the instant invention that the inner diameter of tube 23 may be greater or less than the diameter of cavity 21.

Accordingly, the invention of FIGS. 3 and 4 provides for substantially equal stresses to be induced in radial and circumferential stress sensors 12, 13, 16 and 17, whereby zero shift due to changes in static pressure and changes in the temperature of the transducer is substantially eliminated. For many practical applications of the transducer of the instant invention, the zero shift effect is effectively minimized for an orientation angle $\theta$ selected from the range between 15° and 30°.

While the principles of the invention have now been made clear in an illustrative embodiment, there will be immediately obvious to those skilled in the art any modifications in structure, arrangements, the elements and components used in the practice of the invention, and otherwise, which are particularly adapted for specific environments and operating requirements, without departing from those principles. The appended claims are intended to cover any such modifications, within the limits only of the true spirit and scope of the invention.

The embodiments of the invention in which an exclusive property or right is claimed are defined as follows:

1. A semiconductor pressure transducer comprising:
   a single crystal semiconductor chip having at least one rectilinear edge oriented at an angle of substantially 22.5 degrees with respect to a <110> crystal direction of said chip;
   a pair of radial stress sensors having a piezoresistive characteristic disposed on one surface of said chip; and
   a pair of circumferential stress sensors having a piezoresistive chracterteristic disposed on said one surface of said chip;
   wherein said pairs are oriented along said <110> cryst direction.

2. The transducer of claim 1, wherein said chip is substantially square.

3. The transducer of claim 2, wherein a cavity is formed in the other surface of said chip, and further comprising:
   a cylindrical tube bonded at one end thereof to said other surface of said chip and surrounding said cavity.

4. The transducer of claim 3 wherein said circumferential pair of sensors is symmetrical with an axis passing through the center of said chip.

5. The transducer of claim 1 wherein said angle lies in the range of 15 degrees to 30 degrees.

6. A semiconductor pressure transducer comprising a single crystal semiconductor chip whose edges form a parallel ogram; a pair of radial stress sensors having a piezoresistive characteristic disposed on one surface of said chip; a pair of circumferential stress sensors having a piezoresistive characteristic disposed on said one surface of said chip; wherein one of said pairs is oriented parallel to a <110> crystal direction of said chip; characterized in that one edge of said chip is oriented at an angle of substantially 22.5 degrees with respect to said <110> crystal direction.

7. The transducer of claim 6, wherein said chip is substantially square.

8. The transducer of claim 7, wherein a cavity is formed in the other surface of said chip, and further comprising a cylindrical tube bonded at one end thereof to said other surface of said chip and surrounding said cavity.

9. The transducer of claim 6 wherein said angle lies in the range of 15 degrees to 30 degrees.

10. A semiconductor pressure transducer comprising a single semiconductor chip having at least one rectilinear edge and a circular cavity formed in one surface of said chip; first and second pairs of sensors disposed on the other surface of said chip and having a piezoresistive characteristic, said first pair sensing stress in said chip principally along a first polar coordinate direction relative to said cavity and said second pair sensing stress in said chip principally along a second polar coordinate direction relative to said cavity, said second direction being orthogonal to said first direction;
   characterized in that first direction defines an axis oriented at an angle of substantially 22.5 degrees with respect to said edge.

11. The transducer of claim 10 wherein said chip is substantially square.

12. The transducer of claim 11, further comprising a cylindrical tube bonded at one end thereof to said one surface of said chip and surrounding said cavity.

13. The transducer of claim 12 wherein said first direction is parallel to a radial direction in said cavity and said second direction is parallel to a circumferential direction in said cavity.

14. A semiconductor pressure transducer comprising a single semiconductor chip formed with at least one rectilinear edge and a circular cavity formed in one surface of said chip and having at least one sensor disposed on the other surface of said chip opposite said cavity, said sensor having a piezoresistive characteristic, whereby the resistance of said sensor changes in response to the difference between mutually perpendicular stresses induced in said chip, said sensor being located on said surface such that the difference between said mutually perpendicular stresses is zero at zero pressure differential across said chip.

15. The transducer of claim 14 wherein said sensor is disposed symmetrically relative to a direction oriented at an angle substantially 22.5 degrees with respect to said rectilinear edge.

* * * * *